Dec. 30, 1947. P. MORIN 2,433,474

EXPANSIBLE WHEEL

Filed Dec. 12, 1946

Inventor:
Pierre Morin
By [signature]
Attorney

Patented Dec. 30, 1947

2,433,474

UNITED STATES PATENT OFFICE 2,433,474

EXPANSIBLE WHEEL

Pierre Morin, Rang St. Patrice, St. Lambert, Quebec, Canada

Application December 12, 1946, Serial No. 715,684
In Canada December 24, 1945

4 Claims. (Cl. 301—52)

The present invention pertains to a wheel having an expansible rim and intended for use in connection with various types of ground vehicles. The principal object of the invention is to provide a wheel wherein the rim may be adjusted to various widths according to differing requirements.

Another object of the invention is to provide an expansible rim that is rigid and at the same time light in weight. A further object of the invention is to provide a wheel of the character described that is relatively simple in construction and low in cost. Still another object is to provide simple means for maintaining the rim in various adjustments.

In the accomplishment of these objects the wheel includes an intermediate rim section carried by the spokes and lateral rim sections at both sides of the first section and joined thereto by pivotally attached links. The links permit the lateral sections to be spaced varyingly from the intermediate section.

The lateral links are of angular cross section and are adapted to enclose the intermediate section in the adjustment that determines the minimum rim width. This adjustment is secured by U-shaped clips that enclose the lateral rims and are mounted on the intermediate section so that they may be locked thereto. The maximum width is maintained by spacers also carried by the intermediate rim section and adapted to enter the angles of the lateral rim section.

The invention is fully disclosed by way of example in the following description and in the accompanying drawings in which.

Reference to these views will now be made by use of like characters which are employed to designate corresponding parts throughout.

Figure 1:
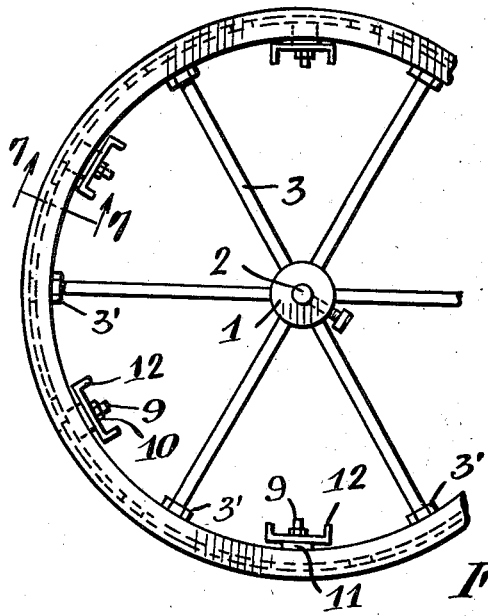
Figure 1 is a side elevation of a wheel in which the outer rims are spaced apart.

As in conventional wheels, the device of the invention comprises a hub 1 adapted to be mounted on a shaft or axle 2. Spokes 3 radiate from the hub and are fastened into a rim 4 to which they are secured by nuts 3'. The rim 4 supports a pair of outer or lateral rims 5 by means of links 6 having their ends pivotally attached respectively to the rims 5 and the fixed rim 4. The rims 5 are of angle section, and the links 6 are connected thereto by rivets 7 and to the rim 4 by rivets 8. The rivets 7 and 8 have a slight amount of play in the rims and in the links in order to permit a free pivotal movement as will presently be described. The links 6 are spaced apart peripherally of the rims and are of sufficient number to provide a substantial addition to the traction surface of the rims 5.

Figure 3:
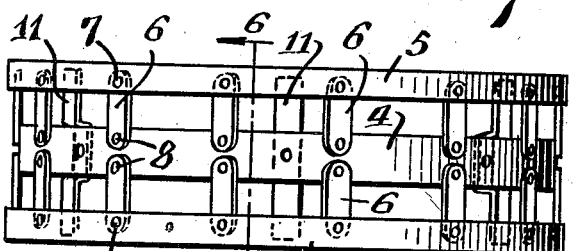
Figure 3 is a plan view corresponding to Figure 1.
Figure 6:
Figure 6 is a section on the line 6—6 of Figure 3.
Figure 4:
Figure 4 is a similar view showing less spacing of the rims.
Figure 5:
Figure 5 is a similar view showing the rims brought together.

As already indicated and by reference to Figures 3, 4 and 5, it is evident that the wheel rim may be adjusted to various widths according to the position of the links 6. The maximum width shown in Figure 3 is obtained when the links are perpendicular to the planes of the rim sections, and the minimum width is obtained when the rim 4 is enclosed within the rims 5, as shown in Figures 5 and 8.

Figure 7:
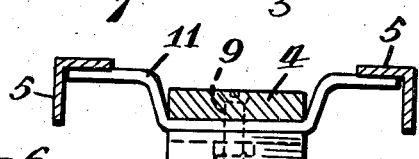
Figure 7 is a section on the line 7—7 of Figure 1.
Figure 8:
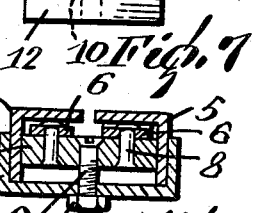
Figure 8 is a section on the line 8—8 of Figure 5.
Figures 9, 10:
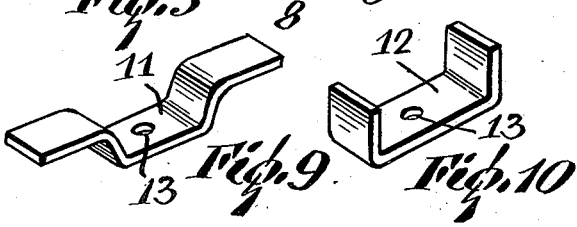
Figures 9 and 10 are perspective views of the clamping members for maintaining various adjustments of the rims.

The extreme positions shown in Figures 3 and 5 are maintained by a number of fittings of the character illustrated in Figures 9 and 10. In each space between the spokes 3, the rim section 4 is apertured to receive a bolt 9 on which is applied a nut 10. The bolts carry the members 11 and 12 shown in Figures 9 and 10, both of which are apertured at 13 to receive the corresponding bolt 9. The members 11 are of channel shape with outwardly extending ends or flanges adapted to be received within the angle rim sections 5, as shown in Figure 7. The members 12 are of simple channel or U-shaped adapted to enclose the retracted rims 5, as shown in Figure 8.

In the adjustment shown in Figures 1, 3 and 7, the spacers 11 are at a right angle to the planes of the rims, and their flanged ends are received in the opposed members 5. In this position the clips 12 are not utilized but are merely retained on the bolts 9 so that they shall not become lost. It is evident that the spacers 11 in the described position maintain the maximum width of the rim assembly. The adjustment is secured by tightening the nuts 10 against the channels or clips 12.

Figure 2:
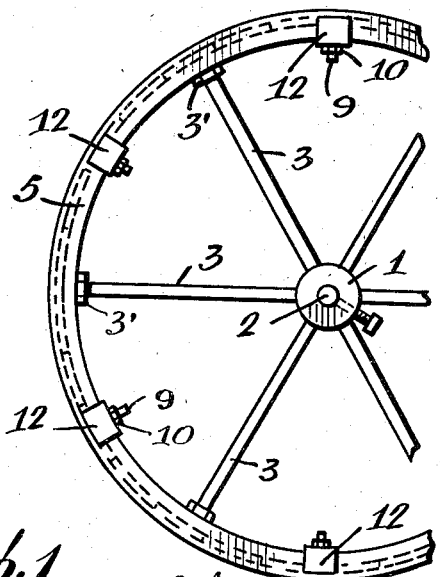
Figure 2 is a similar view in which the rims are brought closer together.

In the adjustment shown in Figures 2, 5 and 8, the spacers 11 have been removed and the clips 12 inverted from the position shown in Figure 7 so that they face outwardly. The angle rim sections 5 are brought close together and over the intermediate section 4 by a swivel movement of the links 6.

In the use of the invention, the width of the assembled rim is adjusted to various conditions of terrain. On soft or snow-covered ground, the maximum width is preferred. On a dry and paved highway, the minimum width may be preferred for maximum speed. Intermediate widths are used for intermediate conditions and also according to the nature of the vehicle.

Although a specific embodiment of the invention has been illustrated and described, it will be understood that various alterations in the details of construction may be made without departing from the scope of the invention as indicated by the appended claims.

What I claim as my invention is:

1. An expansible wheel comprising a hub, a series of spokes extending therefrom, an intermediate rim section on said spokes, links pivotally carried by said section and extending to both sides thereof, lateral rim sections on both sides of the first named section and pivotally attached to said links, and spacers pivotally carried by said intermediate section and adapted to space the lateral sections apart.

2. An expansible wheel comprising a hub, a series of spokes extending therefrom, an intermediate rim section on said spokes, links pivotally carried by said section and extending to both sides thereof, lateral rim sections on both sides of the first named section and pivotally attached to said links, said lateral sections being of angular cross section and adapted to enclose said intermediate section, and spacers pivotally carried by fitted sections and adapted to enter said angular sections to space them apart.

3. An expansible wheel comprising a hub, a series of spokes extending therefrom, an intermediate rim section on said spokes, links pivotally carried by said section and extending to both sides thereof, lateral rim sections on both sides of the first named section and pivotally attached to said links, and channel clips pivotally carried by said intermediate section and adapted to enclose said lateral sections in the contracted position.

4. An expansible wheel comprising a hub, a series of spokes extending therefrom, an intermediate rim section on said spokes, links pivotally carried by said section and extending to both sides thereof, lateral rim sections on both sides of the first named section and pivotally attached to said links, said lateral sections being of angular cross section and adapted to enclose said intermediate section, channel clips pivotally carried by said intermediate section and adapted to enclose said lateral sections in the contracted position, and spacers pivotally carried by said intermediate section and adapted to enter said angular sections to space them apart.

PIERRE MORIN.

REFERENCES CITED

The following references are of record in the file of this patent:

UNITED STATES PATENTS

| Number | Name | Date |
|---|---|---|
| 674,937 | Mussetter | May 28, 1901 |
| 921,557 | Mussetter | May 11, 1909 |
| 1,715,841 | Johnson | June 4, 1929 |

FOREIGN PATENTS

| Number | Country | Date |
|---|---|---|
| 712,009 | France | July 8, 1931 |